(12) United States Patent
Chang et al.

(10) Patent No.: US 11,751,153 B2
(45) Date of Patent: *Sep. 5, 2023

(54) MULTI-MEMBER BLUETOOTH DEVICE CAPABLE OF SYNCHRONIZING AUDIO PLAYBACK BETWEEN DIFFERENT BLUETOOTH CIRCUITS

(71) Applicant: Realtek Semiconductor Corp., Hsinchu (TW)

(72) Inventors: Hung-Chuan Chang, Hsinchu (TW); Yi-Cheng Chen, Hsinchu (TW); Kuan-Chung Huang, Hsinchu (TW); Chin-Wen Wang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,744

(22) Filed: Jun. 3, 2022

(65) Prior Publication Data
US 2022/0295429 A1 Sep. 15, 2022

Related U.S. Application Data

(62) Division of application No. 17/081,652, filed on Oct. 27, 2020, now Pat. No. 11,405,880.

(Continued)

(30) Foreign Application Priority Data

Sep. 29, 2020 (TW) ................................ 109133960

(51) Int. Cl.
*H04W 56/00* (2009.01)
*H04W 4/80* (2018.01)
*H04W 84/20* (2009.01)

(52) U.S. Cl.
CPC ........... *H04W 56/001* (2013.01); *H04W 4/80* (2018.02); *H04W 84/20* (2013.01)

(58) Field of Classification Search
CPC .... H04B 5/0006; H04B 5/0031; H04B 17/20; H04B 7/2125; H04B 7/2662;
(Continued)

(56) References Cited

U.S. PATENT DOCUMENTS 8,768,252 B2 7/2014 Watson et al.
10,009,862 B1 6/2018 Malovany et al.
(Continued)

FOREIGN PATENT DOCUMENTS

JP 2002-152212 A 5/2002
JP 2009/153070 A 7/2009
(Continued)

OTHER PUBLICATIONS

Japanese Office Action for Japanese Application No. 2020-183912, dated Oct. 12, 2021, with English translation.
(Continued)

*Primary Examiner* — Frank Duong
(74) *Attorney, Agent, or Firm* — Birch, Stewart, Kolasch & Birch, LLP

(57) ABSTRACT

A multi-member Bluetooth device for communicating data with a source Bluetooth device, wherein the source Bluetooth device acts as a master in a first piconet. The multi-member Bluetooth device includes a main Bluetooth circuit and an auxiliary Bluetooth circuit. The main Bluetooth circuit acts as a slave in the first piconet, and acts as a master in a second piconet. The auxiliary Bluetooth circuit acts as a slave in the second piconet. The main Bluetooth circuit generates a first slave clock and a second main clock synchronized with a first main clock generated by the source Bluetooth device, and samples a first audio data to be
(Continued)

playback. The auxiliary Bluetooth circuit generates a second slave clock and a third slave clock synchronized with the second main clock, and samples a second audio data to be playback.

6 Claims, 4 Drawing Sheets

Related U.S. Application Data

(60) Provisional application No. 62/930,567, filed on Nov. 5, 2019.

(58) Field of Classification Search
CPC .......... H04B 2201/71346; H04J 3/0635; H04J 3/0658; H04J 2011/0096; H04J 2013/0096; H04L 1/18; H04L 7/0008; H04L 7/027; H04W 4/80; H04W 28/04; H04W 36/18; H04W 36/30; H04W 40/12; H04W 40/22; H04W 56/001; H04W 76/10; H04W 84/18; H04W 84/20; H04W 88/04

See application file for complete search history.

(56) References Cited

U.S. PATENT DOCUMENTS

| | | | |
|---|---|---|---|
| 10,700,817 B2* | 6/2020 | Chen | .......................... H04L 1/08 |
| 10,721,666 B2* | 7/2020 | Chen | ................. H04W 52/0261 |
| 10,750,459 B2 | 8/2020 | Girardier et al. | |
| 10,848,926 B2 | 11/2020 | Kanbara | |
| 2002/0028658 A1 | 3/2002 | Ami et al. | |
| 2003/0016770 A1 | 1/2003 | Trans et al. | |
| 2008/0291863 A1 | 11/2008 | Agren | |
| 2008/0291891 A1 | 11/2008 | Jerlhagen et al. | |
| 2008/0317188 A1 | 12/2008 | Staszewski et al. | |
| 2009/0161602 A1 | 6/2009 | Matsumoto | |
| 2011/0129048 A1* | 6/2011 | Barbe | ............... H04W 56/0015 375/371 |
| 2016/0098244 A1 | 4/2016 | Hsieh et al. | |
| 2018/0006798 A1 | 1/2018 | Bilstad et al. | |
| 2019/0274024 A1 | 9/2019 | Sung et al. | |
| 2019/0319747 A1 | 10/2019 | Chen et al. | |
| 2019/0320345 A1 | 10/2019 | Chen et al. | |
| 2021/0105865 A1 | 4/2021 | Chen et al. | |
| 2021/0136551 A1* | 5/2021 | Chang | ..................... H04W 4/80 |
| 2021/0136711 A1* | 5/2021 | Chen | ................. H04W 56/0015 |
| 2022/0394641 A1* | 12/2022 | Chen | ................... H04W 56/001 |

FOREIGN PATENT DOCUMENTS

| | | |
|---|---|---|
| WO | WO 2019/051089 A2 | 3/2019 |
| WO | WO 2019/083840 A1 | 5/2019 |

OTHER PUBLICATIONS

Japanese Office Action for Japanese Application No. 2020-183919, dated Nov. 24, 2021, with English translation.
Japanese Office Action for Japanese Application No. 2020-184664, dated Nov. 2, 2021, with English translation.
Japanese Office Action for Japanese Application No. 2020-184671, dated Nov. 24, 2021, with English translation.
Korean Office Action dated Dec. 23, 2021 for Application No. 10-2020-0145869 with an English translation.
Korean Office Action dated Dec. 23, 2021 for Application No. 10-2020-0145884 with an English translation.
Korean Office Action dated Dec. 23, 2021 for Application No. 10-2020-0146000 with an English translation.
Korean Office Action dated Dec. 23, 2021 for Application No. 10-2020-0146050 with an English translation.
Taiwanese Notice of Allowance for Taiwanese Application No. 109133960, dated Jan. 29, 2021, with partial English translation.
Taiwanese Office Action and Search Report for Taiwanese Application No. 109133958, dated Dec. 14, 2020, with partial English translation.
Taiwanese Office Action and Search Report for Taiwanese Application No. 109133959, dated Dec. 18, 2020, with partial English translation.
Taiwanese Office Action and Search Report for Taiwanese Application No. 109133960, dated Dec. 18, 2020, with partial English translation.
U.S. Office Action for U.S. Appl. No. 17/081,505 dated Mar. 17, 2022.
U.S. Office Action for U.S. Appl. No. 17/081,591 dated Mar. 9, 2022.
U.S. Office Action for U.S. Appl. No. 17/081,182, dated Jul. 1, 2022.

* cited by examiner

MULTI-MEMBER BLUETOOTH DEVICE CAPABLE OF SYNCHRONIZING AUDIO PLAYBACK BETWEEN DIFFERENT BLUETOOTH CIRCUITS

CROSS-REFERENCE TO RELATED APPLICATIONS

This application is a Divisional of U.S. patent application Ser. No. 17/081,652, filed on Oct. 27, 2020, which claims the benefit of priority to Patent Application No. 109133960, filed in Taiwan on Sep. 29, 2020, and also claims the benefit of priority to U.S. Provisional Application Ser. No. 62/930,567, filed on Nov. 5, 2019; the entirety of which are incorporated herein by reference for all purposes.

BACKGROUND

The disclosure generally relates to a Bluetooth technology and, more particularly, to a multi-member Bluetooth device capable of synchronizing audio playback among different Bluetooth circuits.

A multi-member Bluetooth device is a Bluetooth device formed by multiple Bluetooth circuits cooperating with each other, such as a pair of Bluetooth earphones, a set of Bluetooth speakers, or the like. When the multi-member Bluetooth device connects to another Bluetooth device (hereinafter referred to as a remote Bluetooth device), the remote Bluetooth device treats the multi-member Bluetooth device as a single Bluetooth device.

Many traditional multi-member Bluetooth devices have playback function. In many applications, different Bluetooth circuits may collaborate to playback audio data to produce stereo sound effects or surround sound effects. However, if the playback operations of different Bluetooth circuits in the multi-member Bluetooth device cannot be synchronized with each other, it would cause terrible user experience, thereby reducing the application value and the utilization flexibility of the multi-member Bluetooth device.

SUMMARY

An example embodiment of a multi-member Bluetooth device utilized to operably conduct data transmission with a source Bluetooth device is disclosed. The source Bluetooth device acts as a master in a first piconet. The multi-member Bluetooth device comprises: a main Bluetooth circuit, comprising: a first Bluetooth communication circuit; a first clock adjusting circuit; a first control circuit, coupled with the first Bluetooth communication circuit and the first clock adjusting circuit, arranged to operably control the main Bluetooth circuit to act as a slave in the first piconet, and to act as a master in a second piconet; a first sampling-clock adjusting circuit, coupled with the first control circuit; and a first asynchronous sample rate conversion circuit, coupled with the first sampling-clock adjusting circuit, arranged to operably sample a first audio data based on a first audio sampling clock, and to operably transmit sampled data to a first playback circuit for playback; and an auxiliary Bluetooth circuit, comprising: a second Bluetooth communication circuit; a second clock adjusting circuit; a second control circuit, coupled with the second. Bluetooth communication circuit and the second clock adjusting circuit, arranged to operably control the auxiliary Bluetooth circuit to act as a slave in the second piconet; a second sampling-clock adjusting circuit, coupled with the second control circuit; and a second asynchronous sample rate conversion circuit, coupled with the second sampling-clock adjusting circuit, arranged to operably sample a second audio data based on a second audio sampling clock, and to operably transmit sampled data to a second playback circuit for playback; wherein the first control circuit is further arranged to operably conduct following operations: controlling the first clock adjusting circuit to generate a first slave clock and a second main clock according to a timing data of a first main clock generated by the source Bluetooth device, so that both the first slave clock and the second main clock are synchronized with the first main clock; and controlling the first Bluetooth communication circuit to transmit or receive packets in the first piconet according to the first slave clock, and controlling the first Bluetooth communication circuit to transmit or receive packets in the second piconet according to the second main clock; wherein the second control circuit is further arranged to operably conduct following operations: controlling the second clock adjusting circuit to generate a second slave clock according to a timing data of the second main clock, so that the second slave clock is synchronized with the second main clock; and controlling the second Bluetooth communication circuit to transmit or receive packets in the second piconet according to the second slave clock.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
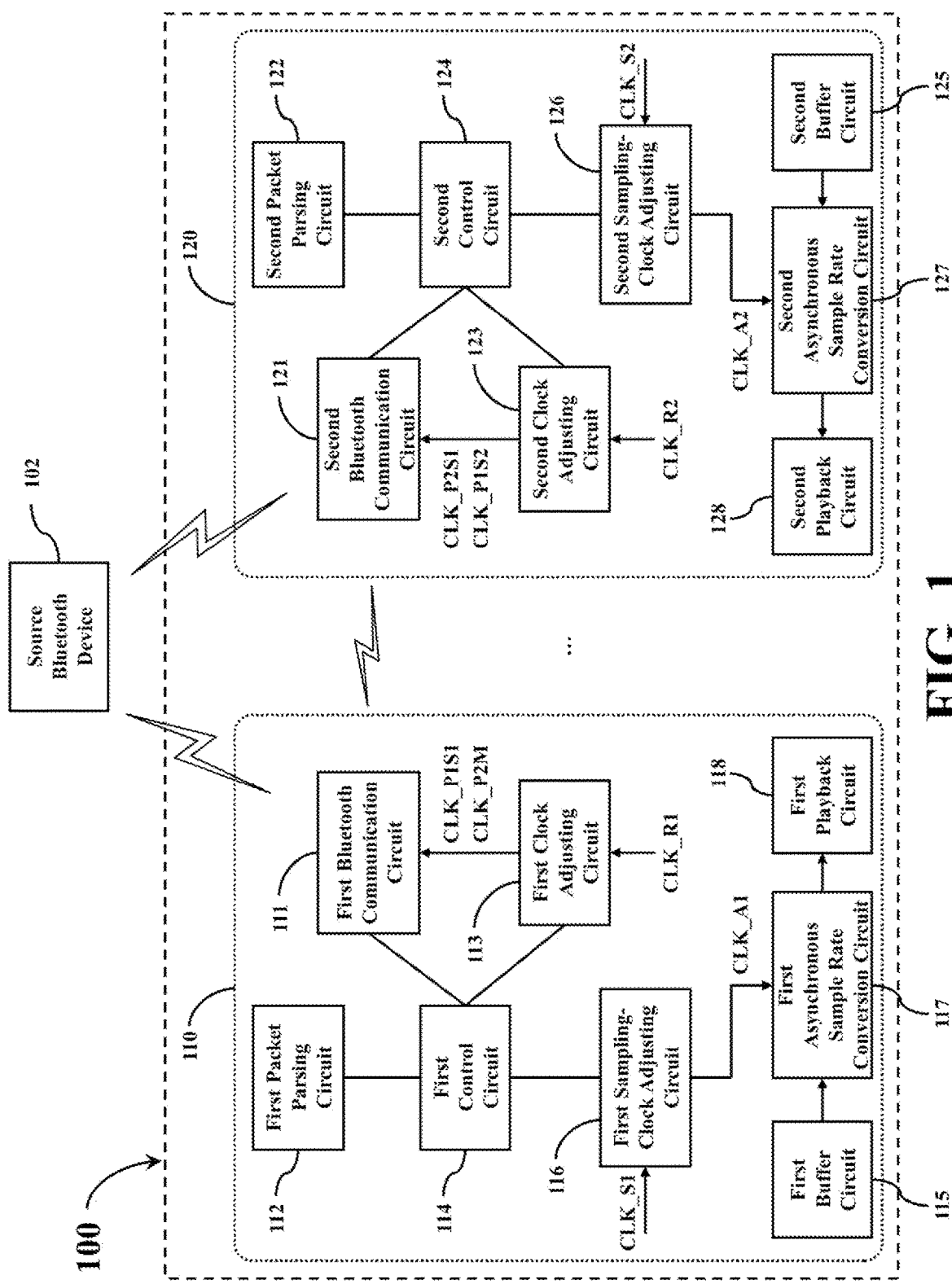
FIG. 1 shows a simplified functional block diagram of a multi-member Bluetooth device according to one embodiment of the present disclosure.

FIG. 1 shows a simplified functional block diagram of a multi-member Bluetooth device 100 according to one embodiment of the present disclosure. The multi-member Bluetooth device 100 is arranged to operably conduct data transmission with a source Bluetooth device 102, and comprises multiple member circuits. For the convenience of description, only two member circuits are illustrated in the embodiment of FIG. 1, which respectively are a main Bluetooth circuit 110 and an auxiliary Bluetooth circuit 120.

In this embodiment, all member circuits of the multi-member Bluetooth device 100 have a similar main circuit structure, but different additional circuit components may be arranged in different member circuits, rather than restricting all member circuits to have an identical circuit structure. As shown in FIG. 1, for example, the main Bluetooth circuit 110 comprises a first Bluetooth communication circuit 111, a first packet parsing circuit 112, a first clock adjusting circuit 113, a first control circuit 114, a first buffer circuit 115, a first sampling-clock adjusting circuit 116, a first asynchronous sample rate conversion circuit 117, and a first playback circuit 118. Similarly, the auxiliary Bluetooth circuit 120 comprises a second Bluetooth communication circuit 121, a second packet parsing circuit 122, a second clock adjusting circuit 123, a second control circuit 124, a second buffer circuit 125, a second sampling-clock adjusting circuit 126, a second asynchronous sample rate conversion circuit 127, and a second playback circuit 128.

In the main Bluetooth circuit 110, the first Bluetooth communication circuit 111 is arranged to operably conduct data communication with other Bluetooth devices. The first packet parsing circuit 112 is arranged to operably parse packets received by the first Bluetooth communication circuit 111. The first clock adjusting circuit 113 is arranged to operably adjust partial working clock signals adopted by the main Bluetooth circuit 110 so as to synchronize a piconet clock adopted by the main Bluetooth circuit 110 and other Bluetooth devices.

The first control circuit 114 is coupled with the first Bluetooth communication circuit 111, the first packet parsing circuit 112, and the first clock adjusting circuit 113, and is arranged to operably control the operations of the aforementioned circuits. In operations, the first control circuit 114 may directly conduct data communication with the source Bluetooth device 102 through the first Bluetooth communication circuit 111 by using a Bluetooth wireless transmission approach, and may conduct data communication with other member circuits through the first Bluetooth communication circuit 111. The first control circuit 114 may further utilize the first packet parsing circuit 112 to parse the packets received by the first Bluetooth communication circuit 111 so as to acquire related data or instructions.

The first buffer circuit 115 is arranged to operably store audio data for playback (hereinafter referred to as first audio data). In practice, the aforementioned first audio data may be audio data pre-stored in the first buffer circuit 115 by the manufacturers or users, audio data transmitted from source Bluetooth device 102, audio data transmitted from other Bluetooth circuits (e.g., the auxiliary Bluetooth circuit 120), or audio data transmitted from other circuits.

The first sampling-clock adjusting circuit 116 is coupled with the first control circuit 114, and is arranged to operably generate a first audio sampling clock under control of the first control circuit 114.

The first asynchronous sample rate conversion circuit 117 is coupled with the first sampling-clock adjusting circuit 116 and the first playback circuit 118. The first asynchronous sample rate conversion circuit 117 is arranged to operably sample the first audio data in the first buffer circuit 115 based on the first audio sampling clock, and to operably transmit sampled data to the first playback circuit 118 for playback.

In the auxiliary Bluetooth circuit 120, the second Bluetooth communication circuit 121 is arranged to operably conduct data communication with other Bluetooth devices. The second packet parsing circuit 122 is arranged to operably parse the packets received by the second Bluetooth communication circuit 121. The second clock adjusting circuit 123 is arranged to operably adjust partial working clock signals adopted by the auxiliary Bluetooth circuit 120 so as to synchronize a piconet clock adopted by the auxiliary Bluetooth circuit 120 and other Bluetooth devices.

The second control circuit 124 is coupled with the second Bluetooth communication circuit 121, the second packet parsing circuit 122, and the second clock adjusting circuit 123, and is arranged to operably control the operations of the aforementioned circuits. In operations, the second control circuit 124 may conduct data communication with other Bluetooth devices through the second Bluetooth communication circuit 121 by using the Bluetooth wireless transmission approach, and may conduct data communication with other member circuits through the second Bluetooth communication circuit 121. The second control circuit 124 may further utilize the second packet parsing circuit 122 to parse the packets received by the second Bluetooth communication circuit 121 so as to acquire related data or instructions.

The second buffer circuit 125 is arranged to operably store audio data for playback (hereinafter referred to as second audio data), in practice, the aforementioned second audio data may be audio data pre-stored in the second buffer circuit 125 by the manufacturers or users, audio data transmitted from source Bluetooth device 102, audio data transmitted from other Bluetooth circuits (e.g., the main Bluetooth circuit 110), or audio data transmitted from other circuits.

The second sampling-clock adjusting circuit 126 is coupled with the second control circuit 124, and is arranged to operably generate a second audio sampling clock under control of the second control circuit 124.

The second asynchronous sample rate conversion circuit 127 is coupled with the second sampling-clock adjusting circuit 126 and the second playback circuit 128. The second asynchronous sample rate conversion circuit 127 is arranged to operably sample the second audio data in the second buffer circuit 125 based on the second audio sampling clock, and to operably transmit sampled data to the second playback circuit 128 for playback.

In practice, each of the aforementioned first Bluetooth communication circuit 111 and second. Bluetooth communication circuit 121 may be realized with appropriate wireless communication circuits supporting various versions of Bluetooth communication protocols. Each of the aforementioned first packet parsing circuit 112 and the second packet parsing circuit 122 may be realized with various packet demodulating circuits, digital processing circuits, microprocessors, or ASICs (Application Specific integrated Circuits). Each of the aforementioned first clock adjusting circuit 113, second clock adjusting circuit 123, first sampling-clock adjusting circuit 116, and the second sampling-clock adjusting circuit 126 may be realized with various appropriate circuits capable of comparing and adjusting clock frequency and/or clock phase, such as various PLLs (phase-locked loops) or DLLs (delay-locked loops) or the like. Each of the aforementioned first control circuit 114 and the second control circuit 124 may be realized with various micro-processors or digital signal processing circuits having appropriate computing capability. Each of the aforementioned first buffer circuit 115 and second buffer circuit 125 may be realized with various volatile memory circuits or non-volatile memory circuits. Each of the aforementioned first asynchronous sample rate conversion circuit 117 and second asynchronous sample rate conversion circuit 127 may be realized with various appropriate digital circuits, analog circuits, or digital/analog hybrid circuits. Each of the aforementioned first playback circuit 118 and second playback circuit 128 may be realized with various appropriate digital audio playback circuits, analog audio playback circuits, or digital/analog hybrid audio playback circuits.

In some embodiments, the first clock adjusting circuit 113 or the second clock adjusting circuit 123 may be respectively integrated into the first control circuit 114 or the second control circuit 124. The first sampling-clock adjusting circuit 116 or the second sampling-clock adjusting circuit 126 may be respectively integrated into the first control circuit 114 or the second control circuit 124. In addition, the aforementioned first packet parsing circuit 112 and the second packet parsing circuit 122 may be respectively integrated into the aforementioned first Bluetooth communication circuit 111 and second Bluetooth communication circuit 121.

In other words, the aforementioned first Bluetooth communication circuit 111 and first packet parsing circuit 112 may be realized with separate circuits, or may be realized with the same circuit. Similarly, the aforementioned second Bluetooth communication circuit 121 and second packet parsing circuit 122 may be realized with separate circuits, or may be realized with the same circuit.

In applications, different functional blocks of the aforementioned main Bluetooth circuit 110 may be integrated into a single circuit chip. For example, all functional blocks of the main Bluetooth circuit 110 or functional blocks except the first playback circuit 118 of the main Bluetooth circuit 110 may be integrated into a single Bluetooth controller IC. Similarly, all functional blocks of the auxiliary Bluetooth circuit 120 or functional blocks except the second playback circuit 128 of the auxiliary Bluetooth circuit 120 may be integrated into another single Bluetooth controller IC.

In practical applications, the multi-member Bluetooth device 100 may be realized with a Bluetooth device formed by multiple Bluetooth circuits cooperating with each other, such as a pair of Bluetooth earphones, a set of Bluetooth speakers, or the like. The source Bluetooth device 102 may be realized with various electronic apparatuses with Bluetooth communication function such as computers, mobile phones, tablet computers, smart speakers, or game consoles, or the like.

As can be appreciated from the foregoing descriptions, different member circuits of the multi-member Bluetooth device 100 may conduct data communication with one another through respective Bluetooth communication circuits, so as to form various types of Bluetooth network. When the multi-member Bluetooth device 100 conducts data communication with the source Bluetooth device 102, the source Bluetooth device 102 treats the multi-member Bluetooth device 100 as a single Bluetooth device.

The main Bluetooth circuit 110 may adopt various existing mechanisms to receive the packets issued from the source Bluetooth device 102, and during the operation of the main Bluetooth circuit 110, the auxiliary Bluetooth circuit 120 may acquire the packets issued from the source Bluetooth device 102 by adopting appropriate mechanisms.

For example, in a period during which the main Bluetooth circuit 110 receives the packets issued from the source Bluetooth device 102, the auxiliary Bluetooth circuit 120 may operate at a sniffing mode to actively sniff the packets issued from the source Bluetooth device 102. Alternatively, the auxiliary Bluetooth circuit 120 may operate at a relay mode to passively receive the packets forwarded from the main Bluetooth circuit 110 after the packets issued from the source Bluetooth device 102 are received by the main Bluetooth circuit 110, and the auxiliary Bluetooth circuit 120 does not actively sniff the packets issued from the source Bluetooth device 102.

Please note that two terms "main Bluetooth circuit" and "auxiliary Bluetooth circuit" used throughout the description and claims are merely for the purpose of distinguishing different approaches of receiving packets issued from the source Bluetooth device 102 adopted by different member circuits, rather than indicating that the main Bluetooth circuit 110 is required to have a specific level of control authority over other operational aspects of the auxiliary Bluetooth circuit 120. In practice, the main Bluetooth circuit 110 and the auxiliary Bluetooth circuit 120 may exchange their roles with each other intermittently, periodically, or in situations where specific conditions are matched.

Figure 2:
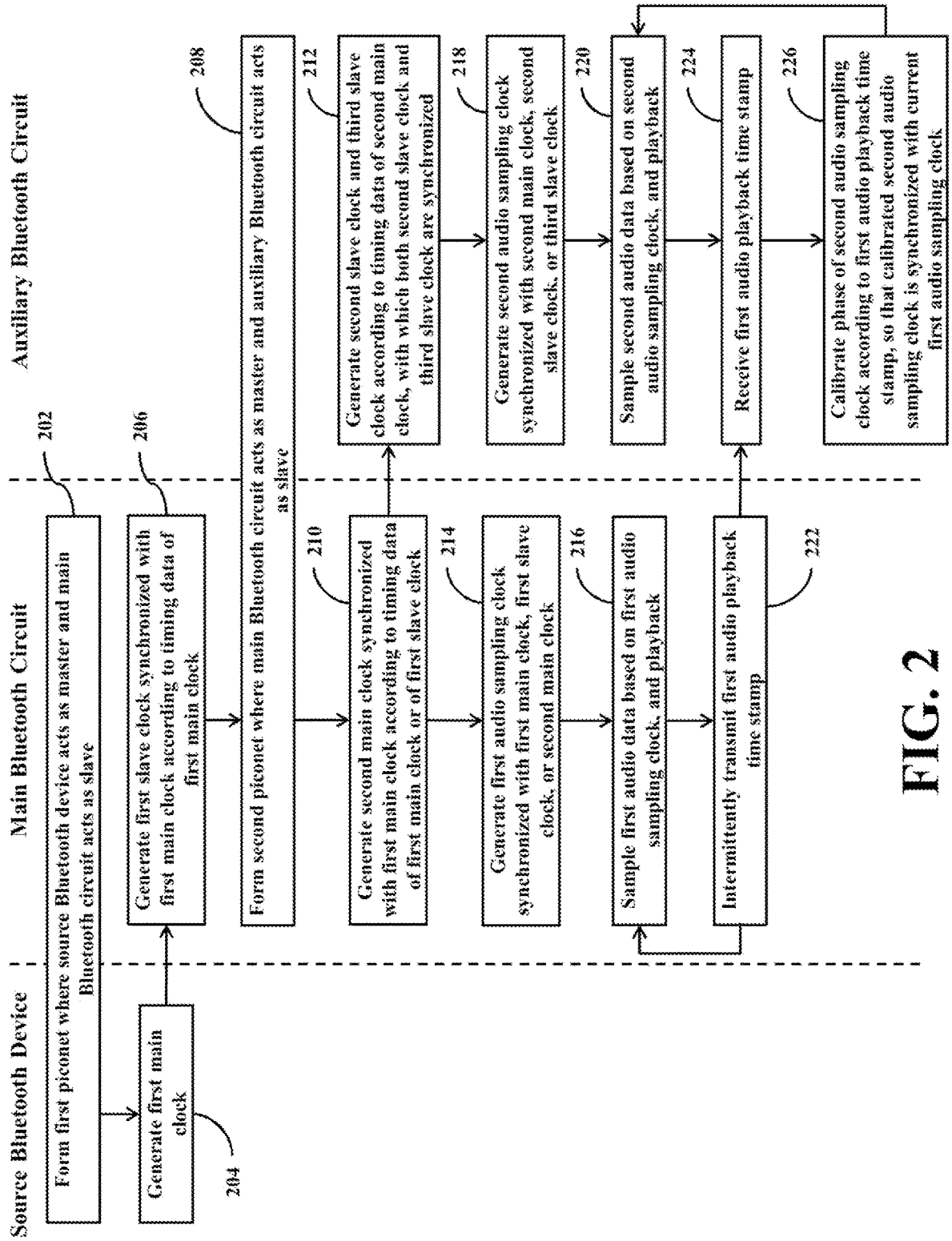
FIG. 2 shows a simplified flowchart of a method for synchronizing audio playback operations of different Bluetooth circuits according to one embodiment of the present disclosure.
Figure 3:
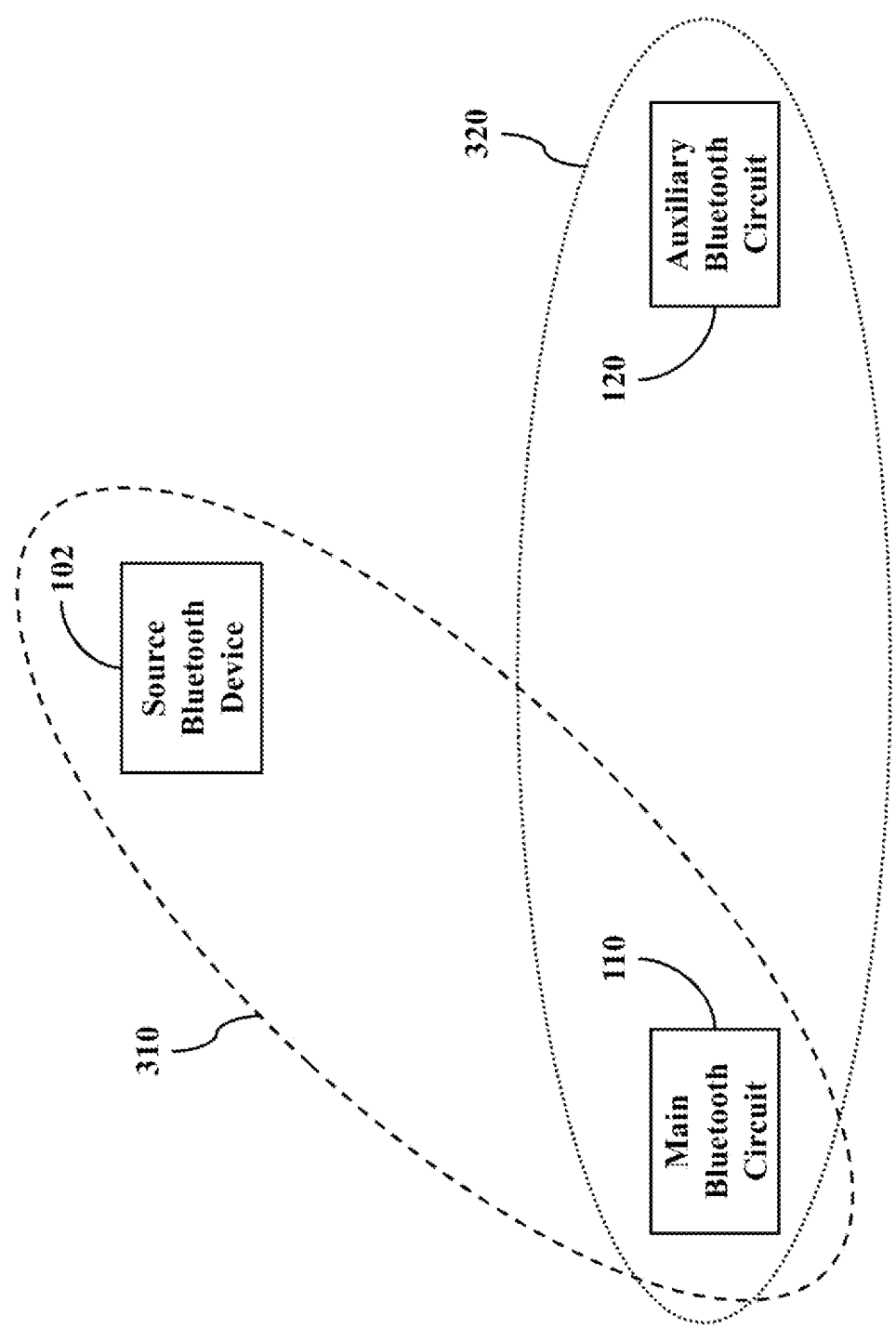
FIG. 3 shows a simplified schematic diagram of a scatternet formed by the multi-member Bluetooth device of FIG. 1 according to one embodiment of the present disclosure.

The operations of the multi-member Bluetooth device 100 will be further described in the following by reference to FIG. 2 through FIG. 3. FIG. 2 shows a simplified flowchart of a method for synchronizing audio playback operations of different Bluetooth circuits according to one embodiment of the present disclosure. FIG. 3 shows a simplified schematic diagram of a scatternet formed by the multi-member Bluetooth device 100 according to one embodiment of the present disclosure.

In the flowchart of FIG. 2, operations within a column under the name of a specific device are operations to be performed by the specific device. For example, operations within a column under the label "source Bluetooth device" are operations to be performed by the source Bluetooth device 102; operations within a column under the label "main Bluetooth circuit" are operations to be performed by the main Bluetooth circuit 110; operations within a column under the label "auxiliary Bluetooth circuit" are operations to be performed by the auxiliary Bluetooth circuit 120. The same analogous arrangement also applies to the subsequent flowcharts.

As shown in FIG. 2, the main Bluetooth circuit 110 of the multi-member Bluetooth device 100 performs the operation 202 with the source Bluetooth device 102 so as to utilize various methods complying with Bluetooth communication protocols to form a first piconet 310 as shown in FIG. 3. In the operation 202, the source Bluetooth device 102 acts as a master in the first piconet 310, and the main Bluetooth circuit 110 of the multi-member Bluetooth device 100 acts as a slave in the first piconet 310.

In the operation 204, the source Bluetooth device 102 generates a first main clock CLK_P1M, and schedules the transmission or reception of Bluetooth packets in the first piconet 310 based on the first main clock CLK_P1M. Therefore, the first main clock CLK_P1M is not only a native system clock of the source Bluetooth device 102 but also a master clock of the first piconet 310 simultaneously.

Additionally, the source Bluetooth device 102 generates and transmits a first piconet timing packet comprising a timing data of the first main clock CLK_P1M to the first piconet 310. In practice, the source Bluetooth device 102 may utilize various appropriate data to be the timing data of the first main clock CLK_P1M. For example, the source Bluetooth device 102 may utilize a count value of a specific edge of the first main clock CLK_P1M (e.g., the rising edge) to be the timing data of the first main clock CLK_P1M, and writes the count value corresponding to the first main clock CLK_P1M into a FHS packet (frequency hop synchronization packet) so as to form the first piconet timing packet.

In the operation 206, the main Bluetooth circuit 110 is arranged to operably generate a first slave clock CLK_P1S1 according to the timing data of the first main clock CLK_P1M, so that the first slave clock CLK_P1S1 is synchronized with the first main clock CLK_P1M and utilized to be a slave clock in the first piconet 310. In practice, the first Bluetooth communication circuit 111 may receive the first piconet timing packet generated by the source Bluetooth device 102 through the first piconet 310, the first control circuit 114 may control the first packet parsing circuit 112 to acquire the timing data (such as a relevant count value) of the aforementioned first main clock CLK_P1M from the first piconet timing packet.

Next, the first control circuit 114 is arranged to operably control the first clock adjusting circuit 113 to generate a first slave clock CLK_P1S1 according to the timing data of the first main clock CLK_P1M, so that the first slave clock CLK_P1S1 is synchronized with the first main clock CLK_P1M. For example, the first control circuit 114 may control the first clock adjusting circuit 113 to adjust a frequency and/or a phase offset of a first reference clock CLK_R1 according to the timing data of the first main clock CLK_P1M, so as to generate the first slave clock CLK_P1S1 having a frequency substantially identical to the frequency of the first main clock CLK_P1M and a phase substantially aligned with the phase of the first main clock CLK_P1M. In practice, the aforementioned first reference clock CLK_R1 may be generated by various appropriate clock generating circuits located inside or outside the main Bluetooth circuit 110.

In operations, the first control circuit 114 is arranged to operably control the first Bluetooth communication circuit 111 to schedule the transmission or reception of the Bluetooth packets in the first piconet 310 based on the first slave clock CLK_P1S1.

In the operation 208, the main Bluetooth circuit 110 and the auxiliary Bluetooth circuit 120 of the multi-member Bluetooth device 100 may utilize various methods complying with Bluetooth communication protocols to form a second piconet 320 as shown in FIG. 3. In this embodiment, the main Bluetooth circuit 110 acts as the master in the second piconet 320, and the auxiliary Bluetooth circuit 120 acts as the slave in the second piconet 320.

In other words, the main Bluetooth circuit 110 is not only a member of the aforementioned first piconet 310 but also a member of the second piconet 320 simultaneously.

In the operation 210, the first control circuit 114 is arranged to operably control the first clock adjusting circuit 113 to generate a second main clock CLK_P2M according to the timing data of the first main clock CLK_P1M or the timing data of the first slave clock CLK_P1S1, so that the second main clock CLK_P2M is synchronized with the first main clock CLK_P1M. For example, the first control circuit 114 may control the first clock adjusting circuit 113 to adjust the frequency and/or the phase offset of the aforementioned first reference clock CLK_R1 according to the timing data of the first main clock CLK_P1M or the timing data of the first slave clock CLK_P1S1 so as to generate the second main clock CLK_P2M having a frequency substantially identical to the frequency of the first main clock CLK_P1M and a phase substantially aligned with the phase of the first main clock CLK_P1M.

In operations, the first control circuit 114 is arranged to operably control the first Bluetooth communication circuit 111 to schedule the transmission or reception of the Bluetooth packets in the second piconet 320 based on the second main clock CLK_P2M. Therefore, the second main clock CLK_P2M is not only the native system clock of the main Bluetooth circuit 110 but also the master clock in the second piconet 320 simultaneously.

As can be appreciated from the foregoing descriptions, both the first slave clock CLK_P1S1 and the second main clock CLK_P2M generated by the first clock adjusting circuit 113 are synchronized with the first main clock CLK_P1M generated by the source Bluetooth device 102. That is, both the frequency of the first slave clock CLK_P1S1 and the frequency of the second main clock CLK_P2M are substantially identical to the frequency of the first main clock CLK_P1M, and both the phase of the first slave clock CLK_P1S1 and the phase of the second main clock CLK_P2M are substantially aligned with the phase of the first main clock CLK_P1M.

In practice, the first control circuit 114 may respectively assign different count values to the aforementioned first slave clock CLK_P1S1 and second main clock CLK_P2M.

The aforementioned method for synchronizing the first slave clock CLK_P1S1 and the second main clock CLK_P2M of the main Bluetooth circuit 110 can effectively increase the Bluetooth bandwidth utilization efficiency of the main Bluetooth circuit 110.

Additionally, in the aforementioned operation 210, the first control circuit 114 is further arranged to operably generate a second piconet timing packet comprising a timing data of the second main clock CLK_P2M, and utilizes the first Bluetooth communication circuit 111 to transmit the second piconet timing packet to the second piconet 320. In practice, the first control circuit 114 may utilize various appropriate data to be the timing data of the second main clock CLK_P2M. For example, the first control circuit 114 may utilize a count value of a specific edge of the second main clock CLK_P2M (e.g., the rising edge) to be the timing data of the second main clock CLK_P2M, and writes the count value corresponding to the second main clock CLK_P2M into a FHS packet so as to form the second piconet timing packet.

In the operation 212, the auxiliary Bluetooth circuit 120 is arranged to operably generate a second slave clock CLK_P2S1 according to the timing data of the second main clock CLK_P2M, so that the second slave clock CLK_P2S1 is synchronized with the second main clock CLK_P2M and utilized to be a slave clock in the second piconet 320. In practice, the second Bluetooth communication circuit 121 may receive the second piconet timing packet generated by the main Bluetooth circuit 110 through the second piconet 320, and the second control circuit 124 may control the second packet parsing circuit 122 to acquire the timing data (such as a relevant count value) of the aforementioned second main clock CLK_P2M from the second piconet timing packet.

Next, the second control circuit 124 is arranged to operably control the second clock adjusting circuit 123 to generate the second slave clock CLK_P2S1 according to the timing data of the first main clock CLK_P1M, so that the first slave clock CLK_P1S1 is synchronized with the first main clock CLK_P1M. For example, the second control circuit 124 may control the second clock adjusting circuit 123 to adjust a frequency and/or a phase offset of a second reference clock CLK_R2 according to the timing data of the second main clock CLK_P2M, so as to generate the second slave clock CLK_P2S1 having a frequency substantially identical to the frequency of the second main clock CLK_P2M and a phase substantially aligned with the phase of the second main clock CLK_P2M. In practice, the aforementioned second reference clock CLK_R2 may be generated by various appropriate clock generating circuits located inside or outside the auxiliary Bluetooth circuit 120.

Additionally, in the operation 212, the second control circuit 124 is further arranged to operably control the second clock adjusting circuit 123 to generate a third slave clock CLK_P1S2 according to the timing data of the second main clock CLK_P2M, so that the third slave clock CLK_P1S2 is synchronized with the second main clock CLK_P2M. For example, the second control circuit 124 may control the second clock adjusting circuit 123 to adjust the frequency and/or the phase offset of the aforementioned second reference clock CLK_R2 according to the timing data of the second main clock CLK_P2M, so as to generate the third slave clock CLK_P1S2 having a frequency substantially identical to the frequency of the second main clock CLK_P2M and a phase substantially aligned with the phase of the second main clock CLK_P2M.

Since the second main clock CLK_P2M generated by the main Bluetooth circuit 110 is synchronized with the first main clock CLK_P1M generated by the source Bluetooth device 102, the aforementioned third slave clock CLK_P1S2 generated by the second clock adjusting circuit 123 is indirectly synchronized with the first main clock CLK_P1M generated by the source Bluetooth device 102, thus the auxiliary Bluetooth circuit 120 can utilize the third slave clock CLK_P1S2 to be a slave clock in the first piconet 310. In this way, the auxiliary Bluetooth circuit 120 is enabled to sniff the Bluetooth packets in the first piconet 310 without being known by the source Bluetooth device 102.

As can be appreciated from the foregoing descriptions, both the second slave clock CLK_P2S1 and the third slave clock CLK_P1S2 generated by the second clock adjusting circuit 123 are synchronized with the second main clock CLK_P2M generated by the main Bluetooth circuit 110. That is, both the frequency of the second slave clock CLK_P2S1 and the frequency of the third slave clock CLK_P1S2 are substantially identical to the frequency of the second main clock CLK_P2M, and both the phase of the second slave clock CLK_P2S1 and the phase of the third slave clock CLK_P1S2 are substantially aligned with the phase of the second main clock CLK_P2M.

In practice, the second control circuit 124 may respectively assign different count values to the aforementioned second slave clock CLK_P2S1 and third slave clock CLK_P1S2.

The aforementioned method for synchronizing the second slave clock CLK_P2S1 and the third slave clock CLK_P1S2 of the auxiliary Bluetooth circuit 120 can effectively increase the Bluetooth bandwidth utilization efficiency of the auxiliary Bluetooth circuit 120.

Afterwards, the second control circuit 124 is arranged to operably control the second Bluetooth communication circuit 121 to schedule the transmission or reception of the Bluetooth packets in the second piconet 320 based on the second slave clock CLK_P2S1. Additionally, the second control circuit 124 is further arranged to operably schedule the reception of the Bluetooth packets in the first piconet 310 based on the third slave clock CLK_P1S2 so as to sniff the Bluetooth packets in the first piconet 310.

As shown in FIG. 2, the multi-member Bluetooth device 100 in this embodiment can further perform the operation 214 through operation 226 to synchronize the audio playback operation conducted by the main Bluetooth circuit 110 and the audio playback operation conducted by the auxiliary Bluetooth circuit 120.

In the operation 214, the first control circuit 114 is arranged to operably control the first sampling-clock adjusting circuit 116 to generate a first audio sampling clock CLK_A1 synchronized with the first main clock CLK_P1M, the first slave clock CLK_P1S1, or the second main clock CLK_P2M. In this embodiment, the first audio sampling clock CLK_A1 is a clock signal utilized to sample the first audio data stored in the first buffer circuit 115, thus the frequency of the first audio sampling clock CLK_A1 is usually lower than the frequency of the first main clock CLK_P1M, the frequency of the first slave clock CLK_P1S1, and the frequency of the second main clock CLK_P2M, but the frequency of the first audio sampling clock CLK_A1 has a fixed ratio relation with the frequency of the first main clock CLK_P1M, the frequency of the first slave clock CLK_P1S1, or the frequency of the second main clock CLK_P2M.

For example, the first control circuit 114 may control the first sampling-clock adjusting circuit 116 to adjust a frequency and/or a phase offset of the first sampling clock CLK_S1 according to the timing data of the first main clock CLK_P1M, so as to generate the first audio sampling clock CLK_A1 having a frequency in a predetermined ratio relation with the frequency of the first main clock CLK_P1M and a phase substantially aligned with the phase of the first main clock CLK_P1M.

For another example, the first control circuit 114 may control the first sampling-clock adjusting circuit 116 to adjust a frequency and/or a phase offset of the first sampling clock CLK_S1 according to the timing data of the first slave clock CLK_P1S1, so as to generate the first audio sampling clock CLK_A1 having a frequency in a predetermined ratio relation with the frequency of the first slave clock CLK_P1S1 and a phase substantially aligned with the phase of the first slave clock CLK_P1S1.

For another example, the first control circuit 114 may control the first sampling-clock adjusting circuit 116 to adjust a frequency and/or a phase offset of the first sampling clock CLK_S1 according to the timing data of the second main clock CLK_P2M, so as to generate the first audio sampling clock CLK_A1 having a frequency in a predetermined ratio relation with the frequency of the second main clock CLK_P2M and a phase substantially aligned with the phase of the second main clock CLK_P2M.

In practice, the aforementioned first sampling clock CLK_S1 may be generated by various appropriate clock generating circuits located inside or outside the main Bluetooth circuit 110.

In the operation 216, the first asynchronous sample rate conversion circuit 117 may sample the first audio data stored in the first buffer circuit 115 based on the first audio sampling clock CLK_A1 under the control of the first control circuit 114, and then transmit sampled audio data to the first playback circuit 118 for playback.

On the other hand, the auxiliary Bluetooth circuit 120 may perform the operation 218 and the operation 220 in FIG. 2.

In the operation 218, the second control circuit 124 is arranged to operably control the second sampling-clock adjusting circuit 126 to generate a second audio sampling clock CLK_A2 which is not only synchronized with the second main clock CLK_P2M, the second slave clock CLK_P2S1, or the third slave clock CLK_P1S2, but also has a frequency substantially identical to the frequency of the first audio sampling clock CLK_A1. In this embodiment, the second audio sampling clock CLK_A2 is a clock signal utilized to sample the second audio data stored in the second buffer circuit 125, thus the frequency of the second audio sampling clock CLK_A2 is usually lower than the frequency of the second main clock CLK_P2M, the frequency of the second slave clock CLK_P2S1, and the frequency of the third slave clock CLK_P1S2, but the frequency of the second audio sampling clock CLK_A2 has a fixed ratio relation with the frequency of the second main clock CLK_P2M, the frequency of the second slave clock CLK_P2S1, or the frequency of the third slave clock CLK_P1S2.

For example, the second control circuit 124 may control the second sampling-clock adjusting circuit 126 to adjust a frequency and/or a phase offset of a second sampling clock CLK_S2 according to the timing data of the second main clock CLK_P2M, so as to generate the second audio sampling clock CLK_A2 having a frequency in a predetermined ratio relation with the frequency of the second main clock CLK_P2M and a phase substantially aligned with the phase of the second main clock CLK_P2M.

For another example, the second control circuit 124 may control the second sampling-clock adjusting circuit 126 to adjust a frequency and/or a phase offset of the second sampling clock CLK_S2 according to the timing data of the second slave clock CLK_P2S1, so as to generate the second audio sampling clock CLK_A2 having a frequency in a predetermined ratio relation with the frequency of the second slave clock CLK_P2S1 and a phase substantially aligned with the phase of the second slave clock CLK_P2S1.

For another example, the second control circuit 124 may control the second sampling-clock adjusting circuit 126 to adjust a frequency and/or a phase offset of the second sampling dock CLK_S2 according to the timing data of the third slave clock CLK_P1S2, so as to generate the second audio sampling clock CLK_A2 having a frequency in a predetermined ratio relation with the frequency of the third slave clock CLK_P1S2 and a phase substantially aligned with the phase of the third slave clock CLK_P1S2.

In practice, the aforementioned second sampling clock CLK_S2 may be generated by various appropriate clock generating circuits located inside or outside the auxiliary Bluetooth circuit 120.

In the operation 220, the second asynchronous sample rate conversion circuit 127 may sample the second audio data stored in the second buffer circuit 125 based on the second audio sampling clock CLK_A2 under the control of the second control circuit 124, and then transmit sampled audio data to the second playback circuit 128 for playback.

As can be appreciated from the foregoing descriptions, the first audio sampling clock CLK_A1 generated by the main Bluetooth circuit 110 is synchronized with the first main clock CLK_P1M, the first slave clock CLK_P1S1, or the second main clock CLK_P2M, and that the second audio sampling clock CLK_A2 generated by the auxiliary Bluetooth circuit 120 is synchronized with the second main clock CLK_P2M, the second slave clock CLK_P2S1, or the third slave clock CLK_P1S2. Since the first main clock CLK_P1M, the first slave clock CLK_P1S1, the second main clock CLK_P2M, the second slave clock CLK_P2S1, and the third slave clock CLK_P1S2 in this embodiment are clock signals substantially synchronized with one another and having a phase substantially aligned with one another, the first audio sampling clock CLK_A1 would thus be indirectly synchronized with the second audio sampling clock CLK_A2, and the phase of the first audio sampling clock CLK_A1 would be substantially aligned with the phase of the second audio sampling clock CLK_A2.

As a result, the audio playback operation conducted by the main Bluetooth circuit 110 and the audio playback operation conducted by the auxiliary Bluetooth circuit 120 can be synchronized with each other without having timing delay issues. Therefore, the aforementioned method for generating the first audio sampling clock CLK_A1 and the second audio sampling clock CLK_A2 enables the audio playback operations of different Bluetooth circuits to be synchronized with each other so as to produce ideal stereo sound effects or surround sound effects, and creates positive user experience, thereby increasing the application value and the utilization flexibility of the multi-member Bluetooth device 100.

As can be appreciated from the foregoing descriptions, the first audio sampling clock CLK_A1 of the main Bluetooth circuit 110 is generated directly or indirectly based on the first reference clock CLK_R1 and the first sampling clock CLK_S1, and the second audio sampling clock CLK_A2 of the auxiliary Bluetooth circuit 120 is generated directly or indirectly based on the second reference clock CLK_R2 and the second sampling clock CLK_S2.

In general, the first reference clock CLK_R1 adopted by the aforementioned main Bluetooth circuit 110 and the second reference clock CLK_R2 adopted by the aforementioned auxiliary Bluetooth circuit 120 are two clock signals which are generated independently. Additionally, the first sampling clock CLK_S1 adopted by the aforementioned the main Bluetooth circuit 110 and the second sampling clock CLK_S2 adopted by the aforementioned the auxiliary Bluetooth circuit 120 are two clock signals which are generated independently.

Accordingly, after the main Bluetooth circuit 110 and the auxiliary Bluetooth circuit 120 synchronously conduct audio playback operations for a certain period of time, it is possible that a frequency mismatch phenomenon and/or a phase mismatch phenomenon may be presence between the first audio sampling clock CLK_A1 of the main Bluetooth circuit 110 and the second audio sampling clock CLK_A2 of the auxiliary Bluetooth circuit 120.

If the first audio sampling clock CLK_A1 of the main Bluetooth circuit 110 and the second audio sampling clock CLK_A2 of the auxiliary Bluetooth circuit 120 cannot be kept synchronized with each other, it will cause the audio playback operation conducted by the main Bluetooth circuit 110 and the audio playback operation conducted by the auxiliary Bluetooth circuit 120 unable to be kept synchronized with each other, thereby resulting in poor user experience.

Therefore, in this embodiment, the main Bluetooth circuit 110 intermittently performs the operation 222 during the audio data playback operation, and the auxiliary Bluetooth circuit 120 intermittently performs the operation 224 and the operation 226 during the audio data playback operation.

In the operation 222, the first control circuit 114 transmits a first audio playback time stamp corresponding to the first audio data to the auxiliary Bluetooth circuit 120 through the first Bluetooth communication circuit 111. In practice, the first control circuit 114 may utilize a relevant count value of the first audio sampling clock CLK_A1 (e.g., the count value of the pulse, the count value of the rising edge, the count value of the falling edge, or the like) to be the aforementioned first audio playback time stamp, and transmit the first audio playback time stamp to the auxiliary Bluetooth circuit 120 through the first Bluetooth communication circuit 111.

In the operation 224, the second control circuit 124 receives the first audio playback time stamp transmitted from the main Bluetooth circuit 110 through the second Bluetooth communication circuit 121.

In the operation 226, the second control circuit 124 controls the second sampling-clock adjusting circuit 126 to calibrate the phase of the second audio sampling clock CLK_A2 according to the first audio playback time stamp (e.g., the aforementioned relevant count value), so that the phase of the calibrated second audio sampling clock CLK__A2 is aligned with the phase of the current first audio sampling clock CLK_A1.

Accordingly, by performing the aforementioned operation 222 through operation 226, it effectively ensures the audio playback operation conducted by the main Bluetooth circuit 110 and the audio playback operation conducted by the auxiliary Bluetooth circuit 120 to be kept synchronized, and prevents timing delay issues. As a result, the aforementioned method enables playback operation collaboratively performed by the main Bluetooth circuit 110 and the auxiliary Bluetooth circuit 120 to produce ideal stereo sound effects or surround sound effects and create positive user experience, thereby increasing the application value and the utilization flexibility of the multi-member Bluetooth device 100.

Figure 4:
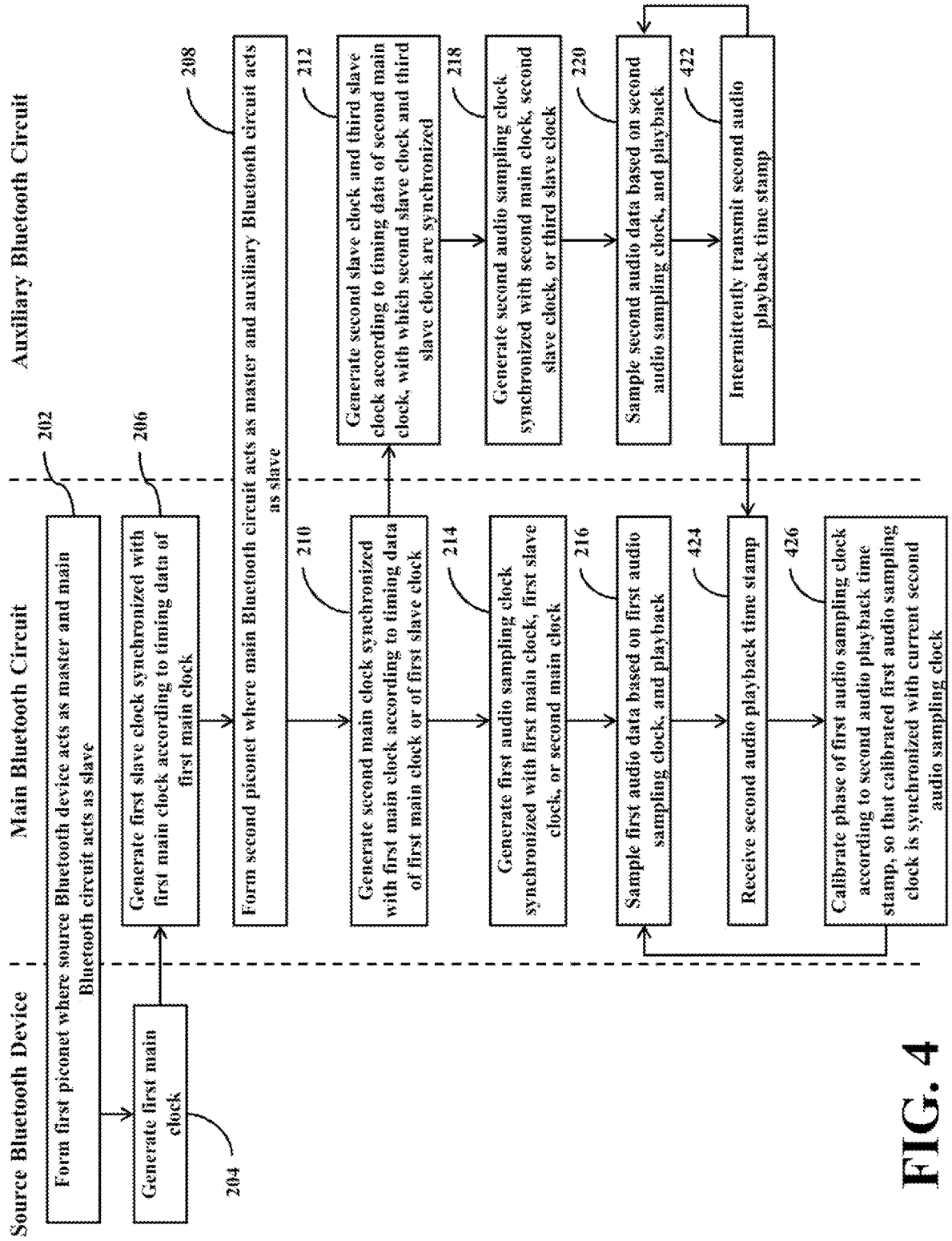
FIG. 4 shows a simplified flowchart of a method for synchronizing audio playback operations of different Bluetooth circuits according to another embodiment of the present disclosure.

Please refer to FIG. 4, which shows a simplified flowchart of a method for synchronizing audio playback operations of different Bluetooth circuits according to another embodiment of the present disclosure.

The operation 202 through operation 220 of FIG. 4 are similar to corresponding operations of the aforementioned embodiment in FIG. 2, but in the embodiment of FIG. 4, the approach for synchronizing the audio playback operation conducted by the main Bluetooth circuit 110 and the audio playback operation conducted by the auxiliary Bluetooth circuit 120 is different from the approach adopted in the aforementioned embodiment of FIG. 2.

As shown in FIG. 4, the auxiliary Bluetooth circuit 120 in this embodiment intermittently performs the operation 422 during the audio data playback operation, and the main Bluetooth circuit 110 intermittently performs the operation 424 and the operation 426 during the audio data playback operation.

In the operation 422, the second control circuit 124 transmits a second audio playback time stamp corresponding to the second audio data to the main Bluetooth circuit 110 through the second Bluetooth communication circuit 121. In practice, the second control circuit 124 may utilize a relevant count value of the second audio sampling clock CLK_A2 (e.g., the count value of the pulse, the count value of the rising edge, the count value of the falling edge, or the like) to be the aforementioned second audio playback time stamp, and transmit the second audio playback time stamp to the main Bluetooth circuit 110 through the second Bluetooth communication circuit 121.

In the operation 424, the first control circuit 114 receives the second audio playback time stamp transmitted from the auxiliary Bluetooth circuit 120 through the first Bluetooth communication circuit 111.

In the operation 426, the first control circuit 114 controls the first sampling-clock adjusting circuit 116 to calibrate the phase of the first audio sampling clock CLK_A1 according to the second audio playback time stamp (e.g., the aforementioned relevant count value), so that the phase of the calibrated first audio sampling clock CLK_A1 is aligned with the phase of the current second audio sampling clock CLK_A2.

Accordingly, by performing the aforementioned operation 422 through operation 426, it effectively ensures the audio playback operation conducted by the main Bluetooth circuit 110 and the audio playback operation conducted by the auxiliary Bluetooth circuit 120 to be kept synchronized, and prevents timing delay issues. As a result, the aforementioned method enables the playback operation collaboratively performed by the main Bluetooth circuit 110 and the auxiliary Bluetooth circuit 120 to produce ideal stereo sound effects or surround sound effects and create positive user experience, thereby increasing the application value and the utilization flexibility of the multi-member Bluetooth device 100.

In the aforementioned multi-member Bluetooth device 100, the main Bluetooth circuit 110 synchronizes both the first slave clock CLK_P1S1 and the second main clock CLK_P2M of the main Bluetooth circuit 110 with the first main clock CLK_P1M determined by the source Bluetooth device 102, thus the first clock adjusting circuit 113 can be realized with a simpler circuit structure.

Additionally, both the first slave clock CLK_P1S1 and the second main clock CLK_P2M adopted by the main Bluetooth circuit 110 are synchronized with the first main clock CLK_P1M, which effectively increases the Bluetooth bandwidth utilization efficiency of the main Bluetooth circuit 110, and also renders the method adopted by the main Bluetooth circuit 110 for updating the first slave clock CLK_P1S1 and the second main clock CLK_P2M to be less complicated.

Similarly, both the second slave clock CLK_P2S1 and the third slave clock CLK_P1S2 of the auxiliary Bluetooth circuit 120 are synchronized with the second main clock CLK_P2M determined by the main Bluetooth circuit 110, thus the second clock adjusting circuit 123 can be realized with a simpler circuit structure.

Moreover, the second slave clock CLK_P2S1 and the third slave clock CLK_P1S2 adopted by the auxiliary Bluetooth circuit 120 are both synchronized with the second main clock CLK_P2M, and are both equivalently synchronized with the first main clock CLK_P1M, which effectively increases the Bluetooth bandwidth utilization efficiency of the auxiliary Bluetooth circuit 120, and also renders the method adopted by the auxiliary Bluetooth circuit 120 for updating the second slave clock CLK_P1S1 and the third slave clock CLK_P1S2 to be less complicated.

More importantly, the second audio sampling clock CLK_A2 adopted by the auxiliary Bluetooth circuit 120 can be indirectly synchronized with the first audio sampling clock CLK_A1 adopted by the main Bluetooth circuit 110, thus the audio playback operation conducted by the second playback circuit 128 and the audio playback operation conducted by the first playback circuit 118 can be synchronized with each other.

Please note that the quantity of the member circuits in the multi-member Bluetooth device 100 is not limited to two as described in the foregoing embodiments, it may be extended to more quantity depending on the requirement of practical circuit applications.

In practice, the multi-member Bluetooth device 100 may selectively adopt one of the two approaches for synchronizing the audio playback described in the aforementioned embodiments in FIG. 2 and FIG. 4 to ensure the audio playback operation conducted by the main Bluetooth circuit 110 and the audio playback operation conducted by the auxiliary Bluetooth circuit 120 to be kept synchronized. Alternatively, the multi-member Bluetooth device 100 may alternately adopt the two approaches to ensure the audio playback operation conducted by the main Bluetooth circuit 110 and the audio playback operation conducted by the auxiliary Bluetooth circuit 120 to be kept synchronized.

Additionally, in some applications, the operation performed by the auxiliary Bluetooth circuit 120 to generate the third slave clock CLK_P1S may be omitted.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A multi-member Bluetooth device (100) utilized to operably conduct data transmission with a source Bluetooth device (102) where the source Bluetooth device (102) being acting as a master in a first piconet (310), the multi-member Bluetooth device (100) comprising:
   a main Bluetooth circuit (110), comprising:
      a first Bluetooth communication circuit (111);
      a first clock adjusting circuit (113);
      a first control circuit (114), coupled with the first Bluetooth communication circuit (111) and the first clock adjusting circuit (113), arranged to operably control the main Bluetooth circuit (110) to act as a slave in the first piconet (310), and to act as a master in a second piconet (320);
      a first sampling-clock adjusting circuit (116), coupled with e first control circuit (114); and
      a first asynchronous sample rate conversion circuit (117), coupled with the first sampling-clock adjusting circuit (116), arranged to operably sample a first audio data based on a first audio sampling clock (CLK_A1), and to operably transmit sampled data to a first playback circuit (118) for playback; and
   an auxiliary Bluetooth circuit (120), comprising:
      a second Bluetooth communication circuit (121);
      a second clock adjusting circuit (123);
      a second control circuit (124), coupled with the second Bluetooth communication circuit (121) and the second clock adjusting circuit (123), arranged to operably control the auxiliary Bluetooth circuit (120) to act as a slave in the second piconet (320);
      a second sampling-clock adjusting circuit (126), coupled with the second control circuit (124); and
      a second asynchronous sample rate conversion circuit (127), coupled with the second sampling-clock adjusting circuit (126), arranged to operably sample a second audio data based on a second audio sampling clock (CLK_A2), and to operably transmit sampled data to a second playback circuit (128) for playback;
   wherein the first control circuit (114) is further arranged to operably conduct following operations:
      controlling the first clock adjusting circuit (113) to generate a first slave clock (CLK_P1S1) and a second main clock (CLK_P2M) according to a timing data of a first main clock (CLK_P1M) generated by the source Bluetooth device (102), so that both the first slave clock (CLK_S1) and the second main clock (CLK_P2M) are synchronized with the first main clock (CLK_P1M); and
      controlling the first Bluetooth communication circuit (111) to transmit or receive packets in the first piconet (310) according to the first slave clock (CLK_P1S1), and controlling the first Bluetooth communication circuit (111) to transmit or receive packets in the second piconet (320) according to the second main clock (CLK_P2M);
   wherein the second control circuit (124) is further arranged to operably conduct following operations:
      controlling the second clock adjusting circuit (123) to generate a second slave clock (CLK_P2S1) according to a timing data of the second main clock (CLK_P2M), so that the second slave clock (CLK_P2S1) is synchronized with the second main clock (CLK_P2M); and
      controlling the second Bluetooth communication circuit (121) to transmit or receive packets in the second piconet (320) according to the second slave dock (CLK_P2S1).

2. The multi-member Bluetooth device (100) of claim 1, wherein the first control circuit (114) is further arranged to operably control the first sampling-clock adjusting circuit (116) to generate the first audio sampling clock (CLK_A1) synchronized with the first main clock (CLK_P1M), the first slave clock (CLK_P1S1), or the second main clock (CLK_P2M), and the second control circuit (124) is further arranged to operably control the second sampling-clock adjusting circuit (126) to generate the second audio sampling clock (CLK_A2) synchronized with the second main clock (CLK_P2M) or the second slave clock (CLK_P2S1), so that the second audio sampling clock (CLK_A2) is indirectly synchronized with the first audio sampling clock (CLK_A1).

3. The multi-member Bluetooth device (100) of claim 2, wherein the first control circuit (114) is further arranged to operably transmit a corresponding first audio playback time stamp of the first audio data to the auxiliary Bluetooth circuit (120) through the first Bluetooth communication circuit (111), and the second control circuit (124) is further arranged to operably receive the first audio playback time stamp through the second Bluetooth communication circuit (121), and to operably control the second sampling-clock adjusting circuit (126) to calibrate a phase of the second audio sampling clock (CLK_A2) according to the first audio playback time stamp, so that a calibrated second audio sampling clock (CLK_A2) is synchronized with a current first audio sampling clock (CLK_A1).

4. The multi-member Bluetooth device (100) of claim 2, wherein the second control circuit (124) is further arranged to operably transmit a corresponding second audio playback time stamp of the second audio data to the main Bluetooth circuit (110) through the second Bluetooth communication circuit (121), and the first control circuit (114) is further arranged to operably receive the second audio playback time stamp through the first Bluetooth communication circuit (111), and to operably control the first sampling-clock adjusting circuit (116) to calibrate a phase of the first audio sampling clock (CLK_A1) according to the second audio playback time stamp, so that a calibrated first audio sampling clock (CLK_A1) is synchronized with a current second audio sampling clock (CLK_A2).

5. The multi-member Bluetooth device (100) of claim 2, wherein the first control circuit (114) is arranged to operably control the first clock adjusting circuit (113) to generate the first slave clock (CLK_P1S1) having a frequency substantially identical to a frequency of the first main clock (CLK_P1M) and a phase substantially aligned with a phase of the first main clock (CLK_P1M) according to the timing data of the first main clock (CLK_P1M), and the first control circuit (114) is further arranged to operably control the first clock adjusting circuit (113) to generate the second main clock (CLK_P2M) having a frequency substantially identical to the frequency of the first main clock (CLK_P1M) and a phase substantially aligned with the phase of the first main clock (CLK_P1M) according to the timing data of the first main clock (CLK_P1M) or a timing data of the first slave clock (CLK_P1S1).

6. The multi-member Bluetooth device (100) of claim 2, wherein the second control circuit (124) is arranged to operably control the second clock adjusting circuit (123) to generate the second slave clock (CLK_P2S1) having a frequency substantially identical to a frequency of the second main clock (CLK_P2M) and a phase substantially aligned with a phase of the second main clock (CLK_P2M) according to the timing data of the second main clock (CLK_P2M).

\* \* \* \* \*